(12) United States Patent
Kim et al.

(10) Patent No.: US 7,842,645 B2
(45) Date of Patent: Nov. 30, 2010

(54) DESULFURIZATION ADSORBENT FOR FUEL CELL AND DESULFURIZING METHOD USING THE SAME

(75) Inventors: Soon-ho Kim, Seoul (KR); Hyun-chul Lee, Yongin-si (KR); Hee-chul Woo, Busan-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 662 days.

(21) Appl. No.: 11/583,843

(22) Filed: Oct. 20, 2006

(65) Prior Publication Data
US 2007/0093385 A1    Apr. 26, 2007

(30) Foreign Application Priority Data
Oct. 26, 2005   (KR) ............... 10-2005-0101354

(51) Int. Cl.
B01J 20/04 (2006.01)
B01J 20/10 (2006.01)
(52) U.S. Cl. .................. 502/411; 502/406
(58) Field of Classification Search ........... 502/411, 502/406
See application file for complete search history.

(56) References Cited

U.S. PATENT DOCUMENTS 5,654,061 A    8/1997   Visioli

FOREIGN PATENT DOCUMENTS

| EP | 405978 A1 * | 1/1991 |
|---|---|---|
| JP | 58-024338 A | 2/1983 |
| JP | 63-137732 A | 6/1988 |
| JP | 06-306377 | 11/1994 |
| JP | 10-237473 | 9/1998 |
| JP | 11-509135 A | 8/1999 |
| JP | 2003-238977 A | 8/2003 |
| JP | 2004-228016 A | 8/2004 |
| JP | 2005-281358 A | 10/2005 |
| WO | WO 2004/080588 A1 | 9/2004 |

OTHER PUBLICATIONS

A. Philippou et al., The Strong Basicity of the Microporous Titanosilicate ETS-10, 57 Catal. Lett. 151-153 (1999).*
L. Lv et al., A Reinforced Study on the Synthesis of Microporous Titanosilicate ETS-10, 76 Micropor. Mesopor. Mater. 113-122 (2004).*
J. Rocha et al., Ga, Ti Avoidance in the Microporous Titangallosilicate ETGS-10, Chem. Commun. 867-868 (1995).*
Y. Goa et al., Liquid-Phase Knoevenagel Reactions Over Modified Basic Microporous Titanosilicate ETS-10, 224 J. Catal. 107-114 (2004).*
Chinese Office Action dated Apr. 8, 2010, issued in corresponding Chinese Patent Application No. 200610142810.6.

* cited by examiner

Primary Examiner—Glenn Caldarola
Assistant Examiner—Randy Boyer
(74) Attorney, Agent, or Firm—Lee & Morse, P.C.

(57) ABSTRACT

A desulfurization adsorbent for a fuel cell has a structure according to Formula 1 below, and a desulfurizing method uses the desulfurization adsorbent. The desulfurization adsorbent displays remarkably excellent adsorption performance for adsorbing sulfur compounds as well as excellent regeneration performance, compared with conventional desulfurization adsorbents. Thus, the desulfurization adsorbent does not need to be replaced even after prolonged use, thus stabilizing the operation of a fuel cell system and reducing costs.

$(M_1)_a\text{-}(Si)_x\text{—}(Ti)_y\text{-}(M_2)_z\text{-}O$     [Formula 1]

wherein $M_1$ is at least one selected from alkali metals, alkaline earth metals, hydrogen, ammonium, rare earths, and transition metals; $4 \leq x/y \leq 500$, $0 \leq z/y \leq 3$, $0 \leq a/(y+z) \leq 1$; and $M_2$ is aluminum (Al), boron (B) or a trivalent metal. The desulfurization adsorbent is produced by subjecting a mixture of a silicon source, a titanium source, and optionally, aluminum, boron or a trivalent metal in an alkali solution to a hydrothermal treatment to obtain a crystalline porous molecular sieve.

12 Claims, 3 Drawing Sheets

DESULFURIZATION ADSORBENT FOR FUEL CELL AND DESULFURIZING METHOD USING THE SAME

CROSS-REFERENCE TO RELATED APPLICATION

This application claims the benefit of Korean Patent Application No. 2005-101354, filed on Oct. 26, 2005, in the Korean Intellectual Property Office, the disclosure of which is incorporated herein in its entirety by reference.

BACKGROUND OF THE INVENTION

1. Field of the Invention

Aspects of the present invention relate to a desulfurization adsorbent for a fuel cell and a desulfurizing method using the same, and more particularly, to a desulfurization adsorbent having an excellent performance for adsorbing sulfur compounds as well as excellent regeneration properties, and a desulfurizing method using the same.

2. Description of the Related Art

A fuel cell is an electricity generating system in which the chemical energy of oxygen and hydrogen contained in hydrocarbon materials such as methanol, ethanol and natural gas is directly converted to electrical energy.

A fuel cell typically includes a stack, a fuel processor (FP), a fuel tank, a fuel pump, etc. The stack constitutes the main body of the fuel cell and has a structure in which a few to a few tens of unit cells are laminated, with each unit cell consisting of a membrane-electrode assembly (MEA) and a separator (or bipolar plate). The fuel pump supplies fuel from the fuel tank to the fuel processor, and the fuel processor reforms and purifies the fuel to generate hydrogen, which is fed to the stack. The hydrogen reaching the stack electrochemically reacts with oxygen to generate electric energy.

A reformer and a water-gas shift reactor in the fuel processor employ a reforming catalyst and a shift catalyst, respectively, to reform a hydrocarbon fuel and to remove carbon monoxide. Typically, hydrocarbon as a raw fuel for production of hydrogen contains sulfur compounds, which is undesirable since the catalysts of the reformer and water-gas shift reactor and the anode catalyst of the membrane-electrode assembly are susceptible to poisoning by sulfur compounds. Therefore, it is necessary to remove sulfur compounds before supplying the hydrocarbon to a reforming process. Accordingly, the hydrocarbon is subjected to a desulfurization process prior to entering the reforming process (See FIG. 1).

In particular, there is a high possibility in the future that city gas (such as, for example, gas supplied by a municipal utility) will be used as the feedstock for fuel cells. However, city gas contains about 15 ppm of a mixture of sulfur compounds that act as odorizing agents, namely, TBM tertiary butyl mercaptan (TBM) and tetrahydrothiophene (THT) at a ratio of 3:7, and it is essential to remove these sulfur compounds from city gas before using city gas in fuel cells.

In order to remove sulfur compounds, a hydrodesulfurization (HDS) process may be used, or a method of using an adsorbent may be used. The hydrodesulfurization process is a reliable process, but requires high temperatures such as 300 to 400° C. and involves complicated operations. Thus, the hydrodesulfurization process is more suited to large-scale plants than pilot scale apparatuses.

Therefore, for smaller-scale apparatuses, it is more appropriate to use an adsorbent for the removal of sulfur compounds such as TBM and THT from a fuel gas. The method of using an adsorbent includes passing the fuel gas through an adsorbent bed, which typically is made of activated carbon, metal oxide or zeolite, to remove sulfur compounds. When the adsorbent becomes saturated with the sulfur compounds, the absorbent becomes unable to remove sulfur compounds from the fuel gas. At that time, the adsorbent needs to be replaced or regenerated. The amount of the adsorbent required and the replacement period for the adsorbent largely depend on the adsorptivity of the adsorbent, and thus an adsorbent having high adsorptivity is advantageous.

Various adsorbents have been suggested. For example, Japanese Patent Application Laid-Open No. Hei 6-306377 discloses a zeolite that is ion-exchanged with multivalent metal ions and that removes mercaptans from city gas. However, this zeolite is unfortunately applicable only to mercaptans.

Among the sulfur compounds mentioned above, THT is more difficult to remove than TBM. It is known that a zeolite containing silver (Ag) has an ability to remove THT. Japanese Patent Application Laid-Open No. Hei 10-237473 describes an adsorbent comprising a Na—X zeolite having a pore size of at least 5 Å. This adsorbent exhibits excellent adsorptivity at ambient temperature, but the adsorptivity drastically decreases when the adsorbent is exposed to moisture.

However, among the desulfurization adsorbents disclosed so far, there has been no desulfurization adsorbent which has excellent adsorption performance as well as regeneration properties, and hence, there is still a demand for improvements in the performance of conventional desulfurization adsorbents.

SUMMARY OF THE INVENTION

Aspects of the present invention provide a desulfurization adsorbent having excellent desulfurization performance and regeneration properties.

Aspects of the present invention also provide a method of desulfurizing using the desulfurization adsorbent to remove sulfur compounds from a fuel gas.

Aspects of the present invention also provide a method of regenerating a desulfurization adsorbent that has adsorbed sulfur compounds.

Aspects of the present invention also provide a desulfurizing apparatus including the desulfurization adsorbent.

Aspects of the present invention also provide a fuel cell system including the desulfurization adsorbent.

According to an aspect of the present invention, there is provided a desulfurization adsorbent in the form of a crystalline porous molecular sieve having a structure of Formula 1 below:

$$(M_1)_a\text{-}(Si)_x\text{-}(Ti)_y\text{-}(M_2)_z\text{-}O \qquad \text{[Formula 1]}$$

wherein $M_1$ is at least one selected from the group consisting of alkali metals, alkaline earth metals, hydrogen, ammonium, rare earths, and transition metals;

$4 \leq x/y \leq 500$, $0 \leq z/y \leq 3$, $0 < a/(y+z) \leq 1$; and $M_2$ is aluminum (Al), boron (B) or a trivalent metal.

According to another aspect of the present invention, there is provided a method of producing a desulfurization adsorbent in the form of a crystalline porous molecular sieve, the method comprising: combining and mixing a silicon source material and a titanium source material in an aqueous alkali solution to produce a mixed solution; placing the mixed solution into a sealed container and subjecting the mixed solution to a hydrothermal treatment to obtain a crystalline porous molecular sieve material; and washing and drying the crystalline porous molecular sieve material to obtain the desulfurization adsorbent.

According to another aspect of the present invention, there is provided a method producing a desulfurization adsorbent in the form of a crystalline porous molecular sieve, the method comprising: combining and mixing a silicon source material, a titanium source material and optionally, a source of boron, aluminum, gallium, or indium, in an aqueous alkali solution to produce a mixed solution; placing the mixed solution into a sealed container and subjecting the mixed solution to a hydrothermal treatment to obtain a crystalline porous molecular sieve material; washing and drying the crystalline porous molecular sieve material to obtain the desulfurization adsorbent; and optionally subjecting the desulfurization adsorbent to ion exchange with a source of at least one of alkali metal, alkaline earth metals, hydrogen, ammonium, rare earths, and transition metals; wherein the desulfurization adsorbent has a structure represented by Formula 1 below:

   [Formula 1]

wherein $M_1$ is at least one selected from alkali metals, alkaline earth metals, hydrogen, ammonium, rare earths, and transition metals;

$4 \leq x/y \leq 500$.

$0 \leq z/y \leq 3$, $0 < a/(y+z) \leq 1$; and $M_2$ is boron (B), aluminum (Al), gallium (Ga), or indium (In).

According to another aspect of the present invention, there is provided a method of desulfurization, comprising contacting the desulfurization adsorbent according to an embodiment of the present invention with a gas containing sulfur compounds.

According to an embodiment of the present invention, the method of desulfurizing may be performed at a temperature ranging from 10° C. to 50° C. and at a pressure ranging from 0.5 atmospheres to 2.5 atmospheres.

According to another aspect of the present invention, there is provided a method of regenerating a desulfurization adsorbent, comprising purging the desulfurization adsorbent according to an embodiment of the present invention with a desorbing gas.

According to an embodiment of the present invention, the method of regenerating may be performed at a temperature ranging from 100° C. to 500° C. for between 10 minutes and 12 hours.

According to another aspect of the present invention, there is provided a desulfurizing apparatus including the desulfurization adsorbent according to an embodiment of the present invention.

According to another aspect of the present invention, there is provided a fuel processor comprising a desulfurizing apparatus; a reformer; and a carbon monoxide stripping apparatus, wherein the desulfurizing apparatus contains the desulfurization adsorbent according to an embodiment of the present invention.

According to another aspect of the present invention, there is provided a fuel cell system including the desulfurization adsorbent according to an embodiment of the present invention.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
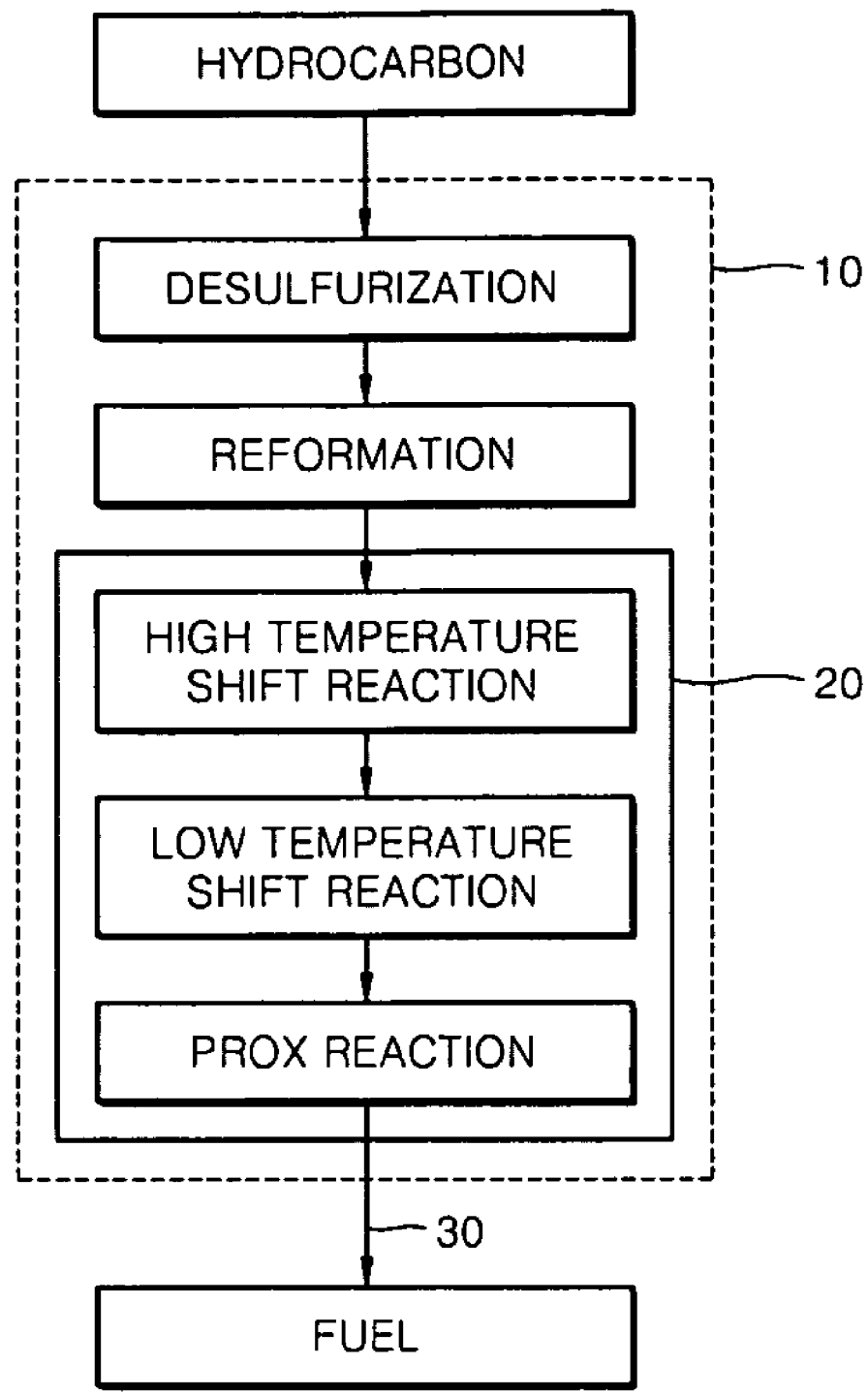
FIG. 1 is a block diagram conceptually illustrating the constitution of a fuel processor for a fuel cell.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

City gas, which can be used as a feedstock for fuel cells, contains sulfur compounds such as THT and TBM, as described above. Hydrocarbon fuel, another potential feedstock for fuel cells, also contains the aforementioned sulfur compounds, as well as mercaptans, heterocyclic compounds containing sulfur, disulfides and the like.

Therefore, an adsorbent that is used to remove the sulfur compounds contained in the feedstocks described above should be able to remove all of the sulfur compounds described above.

More specifically, examples of heterocyclic compounds containing sulfur include thiophene, thiophenol, alkylthiophene and benzothiophene. In particular, representative examples thereof include 2-methylthiophene, 3-methylthiophene, ethylthiophene, dimethylthiophene, trimethylthiophene, benzothiophene, dibenzothiophene, methylbenzothiophene, and dimethylbenzothiophene, but the possible compounds are not limited thereto.

Representative examples of the mercaptans include 1-ethanethiol, 1-propanethiol, 2-propanethiol, 2-butanethiol, t-butylmercaptan, 2-methyl-2-propanethiol, pentanethiol, hexanethiol, heptanethiol, octanethiol, nonanethiol, thiophenol and the like. Other examples of sulfur compounds include sulfides such as dimethyl sulphide, ethylmethyl sulphide and the like, but the possible compounds are not limited thereto.

The present invention provides a desulfurization adsorbent in the form of a crystalline porous molecular sieve having a structure represented by Formula 1 below, for the purpose of removing the sulfur compounds mentioned above from a fuel gas:

   [Formula 1]

wherein $M_1$ is at least one selected from the group consisting of alkali metals, alkaline earth metals, hydrogen, ammonium, rare earths, and transition metals;

$4 \leq x/y \leq 500$, $0 \leq z/y \leq 3$, $0 < a/(y+z) \leq 1$; and $M_2$ is aluminum (Al), boron (B) or a trivalent metal.

According to an aspect of the present invention, the crystalline porous molecular sieve having the structure of Formula 1 has been found to have high performance for adsorption of sulfur compounds as well as excellent regeneration properties. The crystalline porous molecular sieve having the structure of Formula 1 may be an ETS-10 or ETAS-10 based molecular sieve.

$M_1$ in Formula 1 may be at least one selected from the group consisting of hydrogen (H), lithium (Li), sodium (Na), potassium (K), cobalt (Co), and nickel (Ni), but is not limited thereto. That is, at least one of the elements listed above may be bound by ionic bonding.

As particular, non-limiting examples, only sodium may be bound by ionic bonding, or only potassium may be bound by ionic bonding. That is, $M_1$ may be only sodium or only potassium. More particularly, M1 may be essentially only sodium or essentially only potassium, in the case where insignificant amounts of other ions are present.

$M_2$ in Formula 1 may be at least one selected from the group consisting of boron (B), aluminum (Al), gallium (Ga) and indium (In), but is not limited thereto.

In Formula 1, x/y may be in the range of 4 to 500 as described above. As specific, non-limiting examples, x/y may be in the range of 4 to 10, for example, or in the range of 5.0 to 6.5, but is not limited to these ranges. When x/y is less than 4, synthesis of a crystalline porous material consisting of Si and Ti is difficult. When x/y is greater than 500, it is difficult to maintain the crystallinity of the crystalline porous molecular sieve.

In Formula 1, z/y may be in the range of 0 to 3 as described above As a specific, non-limiting example, z/y may be in the range of 0.2 to 0.8. When z/y is greater than 3, the large amount of $M_2$ may cause a change in the sulfur compound adsorption property, and the crystalline porous structure consisting of Si and Ti may be destroyed. When z/y is 0, z is 0, and this implies that the desulfurization adsorbent does not contain a trivalent metal $M_2$.

Furthermore, in Formula 1, a/(y+z) may be greater than 0 and less than or equal to 1, as described above, and for example, may be in the range of 0.2 to 0.8. When the a/(y+z) is greater than 1, use of a high amount of $M_1$ may lead to the use of an amount greater than what is required for the synthesis of a crystalline porous molecular sieve, which is uneconomical, and the crystalline porous structure consisting of Si and Ti may disintegrate. Since the desulfurization adsorbent is required to contain $M_1$, a/(y+z) is greater than 0. If $M_1$ were not present, and only Si and Ti were present, it would be difficult to form a crystalline porous structure.

Hereinafter, a method of producing the desulfurization adsorbent according to an embodiment of the present invention will be described.

First, a silicon source material and a titanium source material are added to an aqueous alkali solution, and sufficiently mixed. The aqueous alkali solution may vary depending on the element of $M_1$, and may be exemplified by, for example, an aqueous NaOH solution, an aqueous KF solution or the like. However, the present invention is not intended to be limited thereto.

The titanium source material may be exemplified by $TiCl_4$, $TiCl_3$, $Ti[O(CH_2)_3CH_3]_5$, $Ti[OC(CH_3)_3]_4$, $Ti(OC_2H_5)_4$, $Ti[OCH(CH_3)_2]_4$, $Ti[OCH_2CH_2CH_3]_4$, $Ti(OCH_3)_4$, $Ti(NO_3)_4$, $Ti_2(SO_4)_3$, $TiOSO_4$, $TiO_2$ or the like, but the present invention is not intended to be limited thereto. The silicon source material may be exemplified by sodium silicate, fumed silica, $SiCl_4$, $SiF_4$, $Si(OC_2H_5)_4$, $Si(OCH_3)_4$ or the like, but the present invention is not intended to be limited thereto.

To provide a desulfurization adsorbent containing $M_2$ (that is, an adsorbent of Formula 1 wherein z is not zero and $M_2$ is aluminum (Al), boron (B) or a trivalent metal such as, for example, gallium or indium), a source of aluminum, boron or the trivalent metal can be included in the mixture of the silicon source material, titanium source material and aqueous alkali solution. For example, $AlCl_3.6H_2O$ can be added to the mixture of the silicon source material, titanium source material and aqueous alkali solution to obtain a desulfurization adsorbent of Formula 1 wherein z is not zero and $M_2$ is aluminum.

The temperature for the mixing process is not particularly limited, but may range from room temperature to about 70° C. Also, the pH of the mixture may be adjusted to the range of 10 to 13 using the aqueous alkali solution mentioned above. When the pH is less than 10, it is difficult to synthesize a crystalline porous molecular sieve, and when the pH is greater than 13, it is also difficult to synthesize a crystalline porous molecular sieve.

Thereafter, the resulting mixed solution is placed in a sealed container and subjected to a hydrothermal treatment. The term "hydrothermal treatment" refers to a process of subjecting a reactant to high temperature and high pressure in a sealed container. Through this hydrothermal treatment, a porous molecular sieve having the structure of Formula 1 is generated, with crystals being formed.

The hydrothermal treatment may be performed at a temperature of, for example, 150° C. to 230° C., but the present invention is not intended to be limited thereto. When the hydrothermal treatment temperature is lower than 150° C., the synthesis of a crystalline porous molecular sieve takes a long time, and it is difficult to obtain sufficient crystallinity. When the hydrothermal treatment temperature exceeds 230° C., it is difficult to synthesize a crystalline porous molecular sieve, and it is also uneconomical.

The hydrothermal treatment can be performed for, for example, 5 hours to 200 hours, but the present invention is not intended to be limited thereto. When the hydrothermal treatment time is less than 5 hours, it is difficult to achieve sufficient crystallinity for the porous molecular sieve. When the hydrothermal treatment time exceeds 200 hours, the process becomes uneconomical, since additional synthesis of the porous molecular sieve does not occur.

Thereafter, the produced solid product is washed and dried, and then the desulfurization adsorbent according to an embodiment of the present invention can be obtained. Methods and conditions for the washing and drying processes are not particularly limited, and methods and conditions that are well known in the pertinent art may be employed.

Further, the desulfurization adsorbent may be subjected to ion exchange to further control the selection of $M_1$ in Formula 1. For example, the desulfurization adsorbent may be subjected to ion exchange with a source of at least one of alkali metal, alkaline earth metals, hydrogen, ammonium, rare earths, and transition metals. As a particular, non-limiting example, the desulfurization adsorbent may be subjected to ion exchange with a source of at least one of hydrogen, lithium, sodium, potassium, cobalt and nickel.

Hereinafter, a desulfurizing method of removing sulfur compounds from a gas using the desulfurization adsorbent according to an embodiment of the present invention will be described.

The desulfurizing method according to the current embodiment of the present invention comprises contacting a gas containing sulfur compounds with the desulfurization adsorbent of the present invention. The gas containing sulfur compounds may be, for example, a hydrocarbon gas, but is not intended to be limited thereto.

The method of contacting the gas containing sulfur compounds with the desulfurization adsorbent of the present invention may be a method of passing the gas containing sulfur compounds through a fixed layer of the desulfurization adsorbent, but is not intended to be limited thereto. Another example of the contacting method may be a method comprising converting the desulfurization adsorbent into a powder or a pellet, packing the powder or pellet in a cylindrical vessel as a fixed bed, and passing a gas containing sulfur compounds through the cylindrical vessel.

The process of contacting a gas containing sulfur compounds with the desulfurization adsorbent of the present invention may be performed at a temperature ranging from 10° C. to 50° C. When this process of contacting is performed at a temperature lower than 10° C., it is uneconomical to maintain the system at such a low temperature. When the contacting is performed at a temperature higher than 50° C., extra expenditure is needed to maintain this temperature, and this is also uneconomical.

The contacting may be also carried out at a pressure ranging from 0.5 atmospheres to 2.5 atmospheres. When the contacting is performed at a pressure lower than 0.5 atmospheres, it is uneconomical to maintain such low pressure. When the contacting is performed at a pressure higher than 2.5 atmospheres, extra expenditure is needed to maintain this pressure, and this is also uneconomical.

The desulfurization adsorbent according to an embodiment of the present invention has excellent adsorption-regeneration properties, unlike conventional desulfurization adsorbents considered in the art of fuel cells. Thus, even though adsorption and regeneration are repeated a number of times, the adsorption performance is hardly decreased.

Hereinafter, a method of regenerating the desulfurization adsorbent which has adsorbed sulfur compounds through the desulfurizing method described above will be explained, according to an embodiment of the present invention.

The present invention provides a method of regenerating a desulfurization adsorbent, comprising purging the desulfurization adsorbent according to an embodiment of the present invention with a desorbing gas, according to an embodiment of the present invention.

The method of regenerating the desulfurization adsorbent according to an embodiment of the present invention which has adsorbed sulfur compounds may be, for example, a method of passing a desorbing gas through a fixed layer of desulfurization adsorbent, but is not intended to be limited thereto. Another example of the contacting method may be a method of passing a desorbing gas through the desulfurization adsorbent, which is in a powder or pellet form and is packed in a cylindrical vessel as a fixed bed.

The desorbing gas may be any inert gas, and may air, nitrogen ($N_2$), oxygen ($O_2$), helium (He), neon (Ne), argon (Ar), methane ($CH_4$), ethane ($C_2H_6$), carbon dioxide ($CO_2$), or mixtures thereof, but the present invention is not intended to be limited thereto.

The process of regeneration may be performed at a temperature ranging from 100° C. to 500° C. When the regeneration is performed at a temperature lower than 100° C., the temperature is so low that the adsorbed sulfur compounds are not easily desorbed. When the regeneration is performed at a temperature higher than 500° C., extra expenditure is needed to maintain the temperature.

The process of regeneration may be performed for between 10 minutes and 12 hours. When the regeneration is performed for a time period shorter than 10 minutes, the duration is so short that the adsorbed sulfur compounds are not sufficiently desorbed. When the regeneration is performed for a time period longer than 12 hours, the desorption effect reaches a maximum, and further operations become unnecessary.

Hereinafter, a desulfurizing apparatus including the desulfurization adsorbent according to an embodiment of the present invention will be explained.

Aspects of the present invention provide a desulfurizing apparatus containing the desulfurization adsorbent according to an embodiment of the present invention. The method of charging the desulfurization adsorbent in the desulfurizing apparatus is not particularly limited.

The desulfurizing apparatus may be included as a part of the fuel processor, at a position preceding the reformer.

In an embodiment of the present invention, the desulfurizing apparatus may have the desulfurization adsorbent of the present invention fixed in a cylindrical vessel as a fixed bed, and have an inlet tube for a gas containing sulfur compounds.

In another embodiment of the present invention, the desulfurizing apparatus may have another tube for introducing a desorbing gas. Furthermore, in the desulfurizing apparatus according to this embodiment, the tube for introducing a desorbing gas may be disposed so that the desorbing gas is supplied in a countercurrent direction to the direction of the gas containing sulfur compounds being introduced.

Hereinafter, a fuel cell system containing the desulfurization adsorbent according to an embodiment of the present invention will be explained.

The fuel cell system may comprise a fuel processor and a fuel cell stack. This fuel cell stack may be a collection of unit fuel cells stacked on one another, each unit fuel cell including an anode including a catalyst layer and a diffusion layer; a cathode including a catalyst layer and a diffusion layer; and an electrolyte membrane disposed in between the cathode and the anode.

The fuel processor may comprise a desulfurizing apparatus; a reformer; and a carbon monoxide stripping apparatus including a high temperature shift reactor, a low temperature shift reactor, and a preferential oxidation (PROX) reactor.

The desulfurization adsorbent according to an embodiment of the present invention may be included in the desulfurizing apparatus mentioned above.

The unit fuel cell according to an embodiment of the present invention may be specifically exemplified by a phosphoric acid fuel cell (PAFC), a proton exchange membrane fuel cell (PEMFC), a molten carbonate fuel cell (MCFC), a solid oxide fuel cell (SOFC) or a direct methanol fuel cell (DMFC). The structure and production method for the unit fuel cell are not particularly limited, and specific examples are disclosed in detail in various documents. Thus, a detailed description of the unit fuel cell will be omitted.

The desulfurization adsorbent according to an embodiment of the present invention has remarkably superior adsorption performance for adsorbing sulfur compounds, compared with conventional desulfurization adsorbents, and also has excellent regeneration performance. Thus, the desulfurization adsorbent does not need to be replaced even after prolonged use. Thus, operation of the fuel cell system is stable and economical.

Hereinafter, the constitution and effect of aspects of the present invention will be described in more detail with reference to specific Examples and Comparative Examples. However, these Examples are only intended to make the present invention more clearly understandable, and not to limit the scope of the present invention.

Example 1

166.8 g of sodium silicate (27% $SiO_2$, 14% NaOH) and 23.1 g of NaOH were dissolved in 120 mL of distilled water to prepare a thoroughly mixed solution. Another solution containing 14.5 mL of $TiCl_4$ and 70.7 g of HCl dissolved in 120 mL of distilled water was prepared, and this solution was mixed with the previously prepared solution by stirring. 14.6 g of KF was added to the mixed solution thus prepared, and then, 56.7 g of distilled water was further added to produce a homogeneous solution. The $TiCl_4$ solution was added by stirring it into the alkaline solution containing NaOH, KF and sodium silicate such that the molar ratio of Si:Ti was 5.7:1, to produce a homogeneous solution, and NaOH was added dropwise thereto in order to obtain a homogeneous gel having a final pH of 11.5. This gel was placed in a high pressure reactor and was subjected to hydrothermal treatment at 200° C. for 17 hours. The hydrothermally treated product was repeatedly washed with deionized water, and then dried in an oven at 110° C. for 24 hours.

Example 2

404.7 g of sodium silicate (27% $SiO_2$, 14% NaOH), 56.2 g of NaOH and 35.3 g of KF were dissolved in 120 mL of distilled water to prepare a thoroughly mixed solution. Another solution containing 244.8 g of $TiCl_3$ (20%) and 19.8 g of $AlCl_3.6H_2O$ dissolved in 120 mL of distilled water was prepared, and this solution was mixed with the previously prepared solution by stirring. 2 g of the seed produced in Example 1 was added to the above-prepared solution by stirring to produce a homogeneous solution. The $TiCl_4$ solution was added to the alkaline solution containing NaOH, KF and sodium silicate such that the molar ratio of Si:Ti was 5.7:1, and then $AlCl_3.6H_2O$ was added such that the molar ratio of Al:Ti was 0.25:1. The mixture was stirred to produce a homogeneous solution, and NaOH was added dropwise thereto in order to obtain a homogeneous gel having a final pH of 11.5. This gel was placed in a high pressure reactor and was subjected to hydrothermal treatment at 200° C. for 17 hours. The hydrothermally treated product was repeatedly washed with deionized water, and then dried in an oven at 110° C. for 24 hours.

Figure 2A:
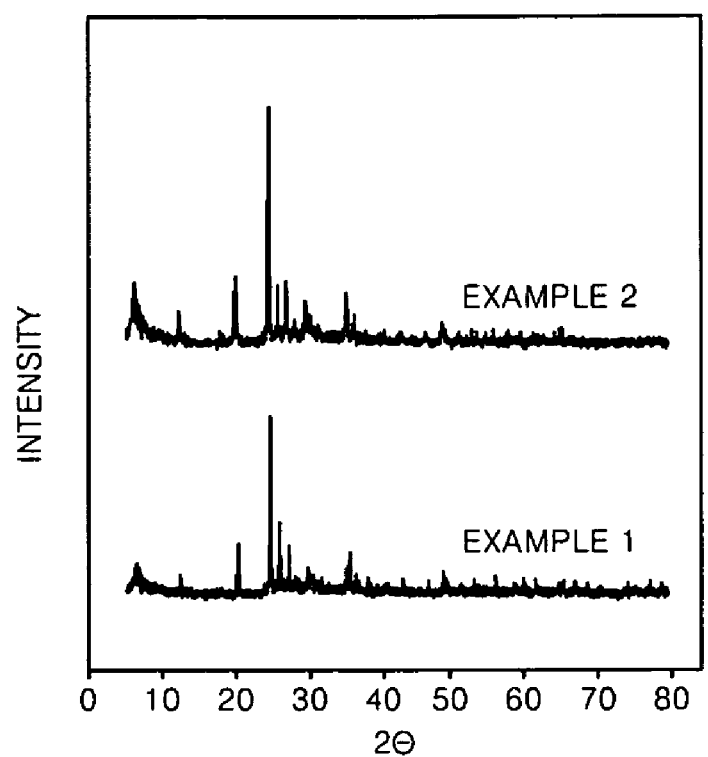
FIG. 2A and FIG. 2B are graphs showing the results of X-ray diffraction analysis and FT-IR analysis, respectively, performed for desulfurization adsorbents produced according to Example 1 and Example 2 of the present invention.
Figure 2B:
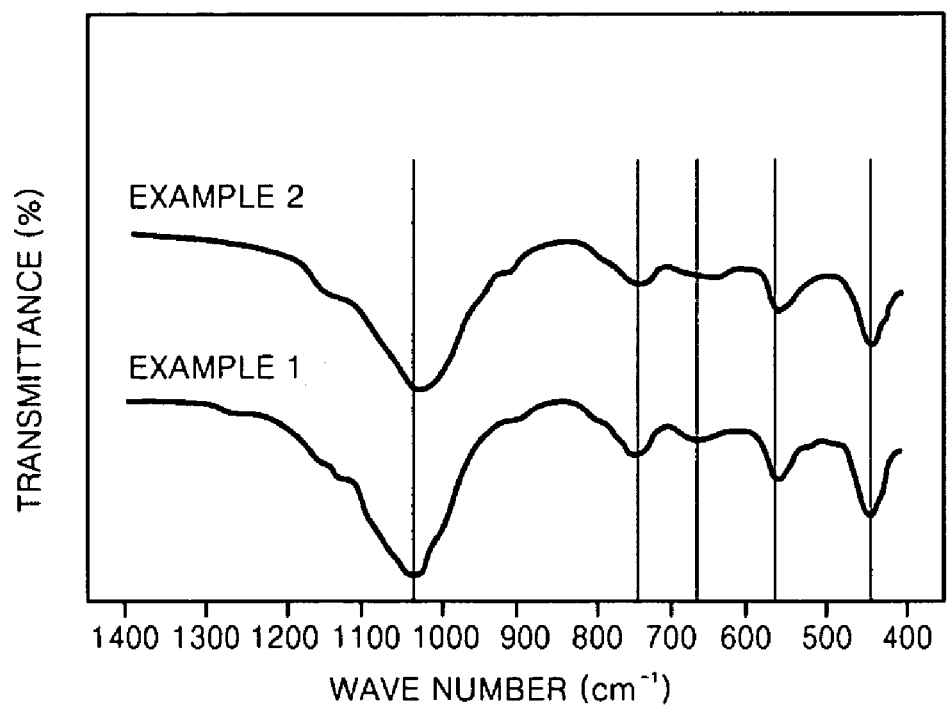

The desulfurization adsorbent thus synthesized was analyzed by X-ray diffraction (XRD) and FT-IR, and the results are presented in FIG. 2A and FIG. 2B, respectively. It can be seen from the patterns shown in FIG. 2A and FIG. 2B that the desulfurization adsorbents synthesized in Example 1 and Example 2 have the structures of ETS-10 and ETAS-10, respectively.

Comparative Example 1

Fumed silica, $Al(OH)_3$, NaOH and KOH were used at a ratio of Si/Al of 5, and at a ratio of (Na+K)/Al of 0.5, in order to synthesize clinoptilolite. The synthesis was performed through hydrothermal synthesis at 150° C. for 72 hours, and then the product was washed and dried (110° C.), and then calcined in air in an oven at 500° C. for 4 hours to produce the clinoptilolite.

Comparative Example 2

A commercially available ZSM-5 based adsorbent was used (Zeolyst International, Inc., CBV2314).

Comparative Example 3

A commercially available mordenite-based adsorbent was used (Zeolyst International, Inc., CBV10A).

Comparative Example 4

A material obtained by spraying a $TiCl_4$ solution (29 mL of $TiCl_4$ and 120 mL of distilled water) through a nozzle under supercritical conditions, was repeatedly washed with deionized water, and then dried in an oven at 110° C. for 24 hours.

Comparative Example 5

A material obtained by spraying a $TiCl_4$ solution, of which the molar ratio of Ti:Si was 2:1 (14.5 mL of $TiCl_4$, 13.9 g of $Si(OC_2H_5)_4$, and 120 mL of distilled water), through a nozzle under supercritical conditions, was repeatedly washed with deionized water, and then dried in an oven at 110° C. for 24 hours.

Comparative Example 6

A material obtained by spraying a $TiCl_4$ solution, of which the molar ratio of Ti:Si was 1:2 (14.5 mL of $TiCl_4$, 55.6 g of $Si(OC_2H_5)_4$, and 120 mL of distilled water), through a nozzle under supercritical conditions, was repeatedly washed with deionized water, and then dried in an oven at 110° C. for 24 hours.

Each of the desulfurization adsorbents produced as described above was subjected to an adsorption test at ambient pressure. A packing of 4 mg of the desulfurization adsorbent was heated up to 400° C. while flowing helium therethrough at a flow rate of 50 mL/min, and pretreating of the desulfurization adsorbent was performed for 1 hour under the same conditions. The desulfurization adsorbent was then cooled to ambient temperature, which was the adsorption temperature, and adsorption was started. Tertiary butylmercaptan (TBM) and tetrahydrothiophene (THT) were used as odorizing agents, and were supplied at a concentration of 0.08 mM and at a space velocity of 250,000 $hr^{-1}$.

Upon desorption, the desulfurization adsorbent was heated to 450° C. at a heating rate of 10° C./min while flowing helium therethrough at a rate of 40 mL/min, and then a desorption curve was obtained. The results are presented in Table 1 below.

TABLE 1

| | Desulfurization adsorbent Component/composition | | | | Amount adsorbed (mmol/g) | |
|---|---|---|---|---|---|---|
| | | $M_1$ | Si/Ti | Al/Ti | Si/Al | TBM | THT |
| Example 1 | ETS-10 | Na, K | 5.7 | — | — | 0.81 | 1.12 |
| Example 2 | ETAS-10 | Na, K | 5.7 | 0.25 | 22.8 | 0.77 | 0.84 |
| Comp. Ex. 1 | Clinoptilolite | Na, K | — | — | 5.0 | 0.22 | 0.09 |
| Comp. Ex. 2 | ZSM-5 | Na | — | — | 110.0 | 0.32 | 0.38 |
| Comp. Ex. 3 | Mordenite | Na | — | — | 30.0 | 0.46 | 0.46 |

TABLE 1-continued

| | Desulfurization adsorbent Component/composition | | | | Amount adsorbed (mmol/g) | |
|---|---|---|---|---|---|---|
| | | $M_1$ | Si/Ti | Al/Ti | Si/Al | TBM | THT |
| Comp. Ex. 4 | Titania | — | Ti 100% | — | — | 0.06 | 0.01 |
| Comp. Ex. 5 | Titanium silicate (Si/Ti = 0.5) | — | 0.5 | — | — | 0.15 | 0.21 |
| Comp. Ex. 6 | Titanium silicate (Si/Ti = 2) | — | 2 | — | — | 0.07 | 0.03 |

It can be seen from Table 1 that the desulfurization adsorbents of Examples 1 and 2 have superior desulfurizing performance compared with the desulfurization adsorbents of the Comparative Examples.

Example 3

A desulfurization adsorbent was produced in the same manner as in Example 1, except that the hydrothermal treatment was performed for 25 hours.

Example 4

A desulfurization adsorbent was produced in the same manner as in Example 1, except that the pH of the reaction solution was 10.6, and the hydrothermal treatment was performed for 16 hours.

Example 5

A desulfurization adsorbent was produced in the same manner as in Example 1, except that the hydrothermal treatment was performed for 26 hours.

Example 6

A desulfurization adsorbent was produced in the same manner as in Example 1, except that the hydrothermal treatment was performed for 15 hours.

The desulfurization adsorbents produced in Example 1 and Examples 3 through 6 were subjected to XRD analysis to measure the relative degrees of crystallinity. The same desulfurizing adsorption test as that performed as described above was performed, and the results are presented in Table 2 below.

The degrees of crystallinity indicated in Table 2 are relative degrees of crystallinity determined with reference to the value of Example 1. It can be seen from Table 2 that there exists a certain correlation between the degree of crystallinity and the amount of sulfur adsorbed. In order to examine the correlation, the relationship between the degree of crystallinity and the amount of sulfur adsorbed was plotted as shown in FIG. 3.

Figure 3:
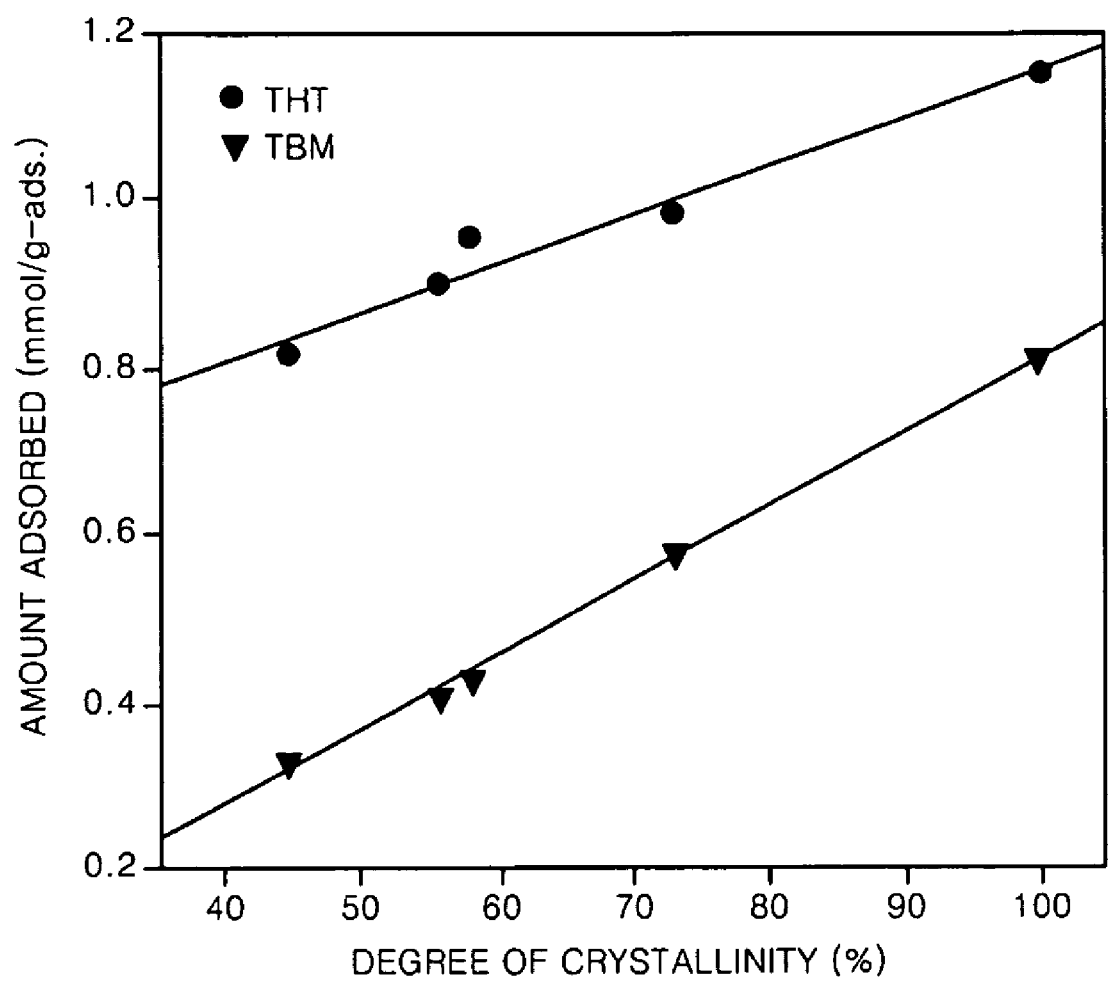
FIG. 3 is a graph showing the results of a test for adsorption performance in relation to the degree of crystallinity of a desulfurization adsorbent according to an embodiment of the present invention.

It can be deduced from FIG. 3 that there exists a direct proportional relationship between the degree of crystallinity and the amount of sulfur adsorbed.

Example 7

A desulfurization adsorbent was produced in the same manner as in Example 2, except that 39.6 g of $AlCl_3 \cdot 6H_2O$ and 69.3 g of NaOH were used so that the molar ratio of Al:Ti was 0.51:1.

Example 8

A desulfurization adsorbent was produced in the same manner as in Example 2, except that 59.4 g of $AlCl_3 \cdot 6H_2O$ and 82.5 g of NaOH were used so that the molar ratio of Al:Ti was 0.75:1.

Example 9

12.75 g of sodium ions ($NaNO_3$) were dissolved in 150 mL of distilled water to prepare a solution, and 10 g of the desulfurization adsorbent produced in Example 2 was added thereto. Subsequently, the mixture was subjected to ion exchange at 85° C. for 5 hours, and the ion-exchanged desulfurization adsorbent was washed three times with 200 mL and then dried in an oven at 110° C. for 16 hours.

TABLE 2

| | Adsorbent component | | Synthesis conditions | | Degree of crystallinity | Amount adsorbed (mmol/g) | |
|---|---|---|---|---|---|---|---|
| | $M_1$ | Si/Ti | pH | Hydrothermal treatment time (hr) | (%) | TBM | THT |
| Ex. 1 | Na, K | 5.7 | 11.49 | 17 | 100.0 | 0.81 | 1.12 |
| Ex. 3 | Na, K | 5.7 | 11.48 | 25 | 73.4 | 0.58 | 0.98 |
| Ex. 4 | Na, K | 5.7 | 10.63 | 16 | 58.0 | 0.43 | 0.96 |
| Ex. 5 | Na, K | 5.7 | 11.50 | 26 | 55.8 | 0.41 | 0.90 |
| Ex. 6 | Na, K | 5.7 | 11.50 | 15 | 44.4 | 0.33 | 0.82 |

Example 10

An ion-exchanged desulfurization adsorbent was produced in the same manner as in Example 9, except that a solution prepared by dissolving 15.1 g of potassium ions ($KNO_3$) in 150 mL of distilled water was used instead of the solution prepared by dissolving 12.75 g of sodium ions ($NaNO_3$) in 150 mL of distilled water.

Example 11

An ion-exchanged desulfurization adsorbent was produced in the same manner as in Example 9, except that a solution prepared by dissolving 10.3 g of lithium ions ($LiNO_3$) in 150 mL of distilled water was used instead of the solution prepared by dissolving 12.75 g of sodium ions ($NaNO_3$) in 150 mL of distilled water.

Example 12

An ion-exchanged desulfurization adsorbent was produced in the same manner as in Example 9, except that a solution prepared by dissolving 4.35 g of cobalt ions ($Co(NO_3)_2 \cdot 6H_2O$) in 150 mL of distilled water was used instead of the solution prepared by dissolving 12.75 g of sodium ions ($NaNO_3$) in 150 mL of distilled water.

Example 13

An ion-exchanged desulfurization adsorbent was produced in the same manner as in Example 9, except that a solution prepared by dissolving 4.37 g of nickel ions ($Ni(NO_3)_2 \cdot 6H_2O$) in 150 mL of distilled water was used instead of the solution prepared by dissolving 12.75 g of sodium ions ($NaNO_3$) in 150 mL of distilled water.

Example 14

An ion-exchanged desulfurization adsorbent was produced in the same manner as in Example 9, except that a solution prepared by dissolving 12 g of ammonium nitrate ($NH_4NO_3$) in 150 mL of distilled water was used instead of the solution prepared by dissolving 12.75 g of sodium ions ($NaNO_3$) in 150 mL of distilled water. After washing and drying as described in Example 9, additional treatment with air at 500° C. for 4 hours was carried out to prepare H ion-exchanged adsorbent.

The desulfurization adsorbents produced in Example 2 and Examples 7 through 14 were subjected to a desulfurizing performance test. The results are presented in Table 3 below.

TABLE 3

| | Adsorbent component | | | | Amount adsorbed (mmol/g) | |
|---|---|---|---|---|---|---|
| | $M_1$ | Si/Ti | Al/Ti | Si/Al | TBM | THT |
| Ex. 2. | Na, K | 5.7 | 0.25 | 22.8 | 0.77 | 0.84 |
| Ex. 7 | Na, K | 5.7 | 0.51 | 11.2 | 0.66 | 0.60 |
| Ex. 8 | Na, K | 5.7 | 0.75 | 7.6 | 0.53 | 0.50 |
| Ex. 9 | Na | 5.7 | 0.25 | 22.8 | 0.86 | 1.14 |
| Ex. 10 | K | 5.7 | 0.25 | 22.8 | 0.85 | 1.14 |
| Ex. 11 | Li | 5.7 | 0.25 | 22.8 | 0.85 | 0.71 |
| Ex. 12 | Co | 5.7 | 0.25 | 22.8 | 0.59 | 0.59 |
| Ex. 13 | Ni | 5.7 | 0.25 | 22.8 | 0.60 | 0.72 |
| Ex. 14 | H | 5.7 | 0.25 | 22.8 | 0.54 | 0.55 |

It can be seen from Table 3 that when the cation corresponding to $M_1$ was substituted with a single cation such as sodium, potassium, lithium, hydrogen, cobalt or nickel, the amount adsorbed increased, as compared with the case where sodium and potassium are both substituted.

In order to examine the regeneration ability of the desulfurization adsorbent of the present invention, the desulfurization adsorbents produced in Example 1 and Example 2 were subjected to a test of repeated adsorption and desorption. The adsorption and desorption conditions were as described previously, and the results are presented in Table 4 below.

TABLE 4

| | Adsorbent component | | | | Sulfur compound | Amount adsorbed (mmol/g) according to the number of repetition | | | | |
|---|---|---|---|---|---|---|---|---|---|---|
| | $M_1$ | Si/Ti | Al/Ti | Si/Al | | 1 | 2 | 3 | 4 | 5 |
| Ex. 1 | Na, K | 5.7 | — | — | TBM | 0.68 | 0.58 | 0.65 | 0.64 | 0.66 |
| | Na, K | 5.7 | — | — | THT | 0.97 | 0.84 | 0.88 | 0.91 | 0.84 |
| Ex. 2 | Na, K | 5.7 | 2.5 | 22.8 | TBM | 0.63 | 0.58 | 0.49 | 0.52 | 0.50 |
| | Na, K | 5.7 | 2.5 | 22.8 | THT | 1.04 | 0.93 | 0.95 | 1.05 | 0.95 |

It can be seen from Table 4 that even though the adsorption/desorption test was performed repeatedly, the adsorption performance for adsorbing sulfur compounds was maintained almost constantly.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A desulfurization adsorbent in the form of a crystalline porous molecular sieve having a structure represented by Formula 1 below:

$(M_1)_a\text{-}(Si)_x\text{---}(Ti)_y\text{-}(M_2)_z\text{-}O$      [Formula 1]

wherein $M_1$ is at least one selected from alkali metals, alkaline earth metals, hydrogen, ammonium, rare earths, and transition metals;

$4 \leq x/y \leq 500$;

$0 < z/y \leq 3$;

$0 < a/(y+z) \leq 1$; and $M_2$ is boron (B), gallium (Ga) or indium (In).

2. The desulfurization adsorbent of claim 1, wherein $M_1$ is at least one selected from hydrogen (H), lithium (Li), sodium (Na), potassium (K), cobalt (Co) and nickel (Ni).

3. The desulfurization adsorbent of claim 1, wherein x/y is in the range of 4 to 10.

4. The desulfurization adsorbent of claim 1, wherein x/y is in the range of 5.0 to 6.5.

5. The desulfurization adsorbent of claim 1, wherein z/y is in the range of 0.2 to 0.8.

6. A method of producing a desulfurization adsorbent in the form of a crystalline porous molecular sieve, the method comprising:

combining and mixing a silicon source material and a titanium source material and a source material of boron, gallium or indium in an aqueous alkali solution to produce a mixed solution;

placing the mixed solution into a sealed container and subjecting the mixed solution to a hydrothermal treatment to obtain a crystalline porous molecular sieve material; and washing and drying the crystalline porous molecular sieve material to obtain the desulfurization adsorbent.

7. A method of producing a desulfurization adsorbent in the form of a crystalline porous molecular sieve, the method comprising:

combining and mixing a silicon source material, a titanium source material and a source of boron, gallium, or indium, in an aqueous alkali solution to produce a mixed solution;

placing the mixed solution into a sealed container and subjecting the mixed solution to a hydrothermal treatment to obtain a crystalline porous molecular sieve material;

washing and drying the crystalline porous molecular sieve material to obtain the desulfurization adsorbent; and optionally subjecting the desulfurization adsorbent to ion exchange with a source of at least one of alkali metal, alkaline earth metals, hydrogen, ammonium, rare earths, and transition metals;

wherein the desulfurization adsorbent has a structure represented by Formula 1 below:

$(M_1)_a\text{-}(Si)_x\text{---}(Ti)_y\text{-}(M_2)_z\text{-}O$      [Formula 1]

wherein $M_1$ is at least one selected from alkali metals, alkaline earth metals, hydrogen, ammonium, rare earths, and transition metals;

$4 \leq x/y \leq 500$;

$0 < z/y \leq 3$;

$0 < a/(y+z) \leq 1$; and $M_2$ is boron (B), gallium (Ga), or indium (In).

8. The method of claim 7, wherein the combining and mixing of the silicon source material, titanium source material and source of boron, gallium, or indium in the aqueous alkali solution to produce a mixed solution is carried out at a temperature ranging from room temperature to about 70° C.

9. The method of claim 7, wherein the mixed solution has a pH of 10 to 13.

10. The method of claim 7, wherein the hydrothermal treatment is carried out at a temperature of 150° C. to 230° C. for 5 to 200 hours.

11. The method of claim 7, wherein subjecting the desulfurization adsorbent to ion exchange is carried out with a source of at least one of hydrogen, lithium, sodium, potassium, cobalt and nickel.

12. A desulfurization adsorbent in the form of a crystalline porous molecular sieve having a structure represented by Formula 1 below:

$(M_1)_a\text{-}(Si)_x\text{---}(Ti)_y\text{-}(M_2)_z\text{-}O$      [Formula 1]

wherein $M_1$ is at least one selected from lithium, cobalt and nickel;

$4 \leq x/y \leq 500$;

$0 < z/y \leq 3$;

$0 < a/(y+z) \leq 1$; and $M_2$ is boron (B), aluminum (Al), or a trivalent metal.

* * * * *